United States Patent
Nakada

(12) 
(10) Patent No.: US 6,379,732 B1
(45) Date of Patent: Apr. 30, 2002

(54) METHOD AND APPARATUS FOR SEVERING ROOT OF BEAN SPROUT AND DEWATERING BEAN SPROUT

(75) Inventor: Masahiro Nakada, Dixon, CA (US)

(73) Assignee: Salad Cosmo U.S.A. Corp., Dixon, CA (US)

( * ) Notice: Subject to any disclaimer, the term of this patent is extended or adjusted under 35 U.S.C. 154(b) by 0 days.

(21) Appl. No.: 10/010,515

(22) Filed: Nov. 13, 2001

(51) Int. Cl.[7] .............................. A23L 1/00; A23N 15/00
(52) U.S. Cl. ........................ 426/506; 99/536; 99/635; 99/637; 99/643; 426/481; 426/518
(58) Field of Search ................................. 426/506, 507, 426/481, 518; 99/536, 635, 637, 643, 443 C

(56) References Cited

U.S. PATENT DOCUMENTS

| | | |
|---|---|---|
| 3,421,836 A | 1/1969 | Sundin et al. |
| 3,897,210 A | 7/1975 | Gruber et al. |
| 4,376,130 A | 3/1983 | Astrack et al. |
| 4,849,237 A | 7/1989 | Hurst |
| 5,326,543 A | 7/1994 | Fiorenzano, Jr. |
| 5,514,345 A | 5/1996 | Garbutt et al. |
| 5,802,965 A | 9/1998 | Lin |
| 5,916,354 A | 6/1999 | Dragt |
| 6,125,745 A | 10/2000 | Kawakami |
| 6,256,926 B1 | 7/2001 | Nakada |

FOREIGN PATENT DOCUMENTS

| | | |
|---|---|---|
| JP | 61-247366 | 11/1986 |
| JP | 1-309671 | 12/1989 |

*Primary Examiner*—George C. Yeung
(74) *Attorney, Agent, or Firm*—Bernhard Kreten

(57) ABSTRACT

A method and apparatus for severing roots of bean sprouts and dewatering the bean sprouts are disclosed. Bean sprouts are supplied onto a severing and dewatering table having a number of severing slits each of which has such a width that a root of a bean sprout falls into each severing slit. Air is caused to blow from above the severing and dewatering table so that a flow of air flowing downward through the severing slits is produced to cause the roots of the bean sprouts on the severing and dewatering table to fall into the severing slits. The roots of the bean sprouts fallen in the severing slits are severed by a cutter blade while water adherent to the bean sprouts are being blown away by wind pressure downward from the severing slits.

9 Claims, 3 Drawing Sheets

METHOD AND APPARATUS FOR SEVERING ROOT OF BEAN SPROUT AND DEWATERING BEAN SPROUT

BACKGROUND OF THE INVENTION

1. Field of the Invention

The present invention relates to a method and apparatus for severing roots of bean sprouts washed in water and for dewatering the bean sprouts.

2. Description of the Related Art

Roots of the bean sprouts harvested are recently cut off for improvement in their appearances and resultant increase in the commodity quality before the bean sprouts are bagged to be shipped. Japanese Patent Application Publication No. 10-136959 discloses an automated method of severing roots of bean sprouts. In the disclosed method, a conveyor for conveying harvested bean sprouts are provided with a first square bar mounted on an upper side thereof so as to be perpendicular to a conveying direction. A second square bar is disposed over the conveyor so as to be parallel to the first square bar. The second square bar is repeatedly moved at a speed higher than the conveyor is driven and then stopped, so that roots of bean sprouts are held between the two square bars thereby to be severed.

The roots of the bean sprouts are thus held between the square bars by horizontal relative movement of the conveyor and the second square bar to be severed in the disclosed method. In this method, however, the roots of the bean sprouts cannot smoothly be held between the two square bars. As a result, the disclosed method has a low severing efficiency and is accordingly unsuitable for severing the roots of the bean sprouts by a large amount at one time. Moreover, the low severing efficiency requires a long severing time, for which the bean sprouts tend to be rubbed against each other on the conveyor. As a result, the bean sprouts are easily bruised or spoiled and accordingly, the quality of the bean sprouts is reduced.

The bean sprouts need to be washed in water and then suitably dewatered before bagged. Accordingly, the severing machine disclosed in the foregoing publication necessitates a separate step of dewatering bean sprouts by blowing the bean sprouts from above or centrifugally dehydrating the bean sprouts. This reduces the productivity and enlarges the production facilities.

Furthermore, the conventional centrifugal dehydration has a good dewatering effect. However, since the centrifugal dehydration is performed at high speeds, a resultant centrifugal force rubs bean sprouts together to thereby damage the bean sprouts.

Additionally, in the conventional dewatering by blowing, bean sprouts are supplied onto a dewatering table formed with a number of dewatering slits. Air is caused to blow the bean sprouts from above so that the bean sprouts are dewatered by the wind pressure. In this while, the dewatering table is vibrated so that the bean sprouts are conveyed by the caused vibration. However, the dewatering slits are clogged with the bean sprouts in a short period of time, whereupon the dewatering performance is reduced. When the wind pressure is increased for improvement in the dewatering performance, the wind pressure presses the bean sprouts against the dewatering table even upon vibration of the dewatering table, whereupon the bean sprouts cannot be moved forward.

SUMMARY OF THE INVENTION

Therefore, an object of the present invention is to provide a method and apparatus for severing roots of bean sprouts and dewatering the bean sprouts, in which the roots of the bean sprouts washed in water can efficiently be severed and the bean sprouts can simultaneously be dewatered, with results of improvements in the productivity and quality while the damage of the bean sprouts is reduced during root severing and dewatering.

To achieve the object, the present invention provides a method of severing roots of bean sprouts and dewatering the bean sprouts comprising the steps of supplying bean sprouts washed in water onto a severing and dewatering table having a number of severing slits each of which has such a width that a root of a bean sprout falls into each severing slit, causing air to blow from above the severing and dewatering table so that a flow of air flowing downward through the severing slits is produced to cause the roots of the bean sprouts on the severing and dewatering table to fall into the severing slits, and severing the roots of the bean sprouts fallen in the severing slits by a cutter blade while water adherent to the bean sprouts are being blown away by wind pressure downward from the severing slits. According to the above-described method, the roots of the bean sprouts can efficiently be severed and the bean sprouts can simultaneously be dewatered efficiently while the damage of the bean sprouts is reduced. Consequently, both of the productivity and quality of the bean sprouts can be improved.

Either cutter blade or severing and dewatering table may be moved. In a case where the cutter blade is moved, the cutter blade is preferably moved along the upper side of the severing and dewatering table. In this construction, the cutter blade serves to feed the bean sprouts out of the severing and dewatering table after the severing of the roots as well as to sever the roots of the bean sprouts. Consequently, both severing the roots and carrying the bean sprouts from the table can efficiently be performed by the movement of the cutter blade continuously even when the wind pressure is increased for improvement in the dewatering performance. However the cutter blade may be moved along the underside of the severing and dewatering table when the severing and dewatering table has a small thickness.

The severing slits of the table may be formed by punching a metal plate, for example. Alternatively, the severing and dewatering table may comprise a number of bar-shaped members having respective edges for severing the root of the bean sprout and arranged in parallel at an interval of a space substantially equal to the width of each severing slit. In this construction, the spaces between the bar-shaped members serve as the severing slits respectively. Consequently, the space between the bar-shaped members can be changed according to a type or size of the bean sprout whereupon the intervals of the severing slits can easily be adjusted.

When a flat cutter blade is disposed in parallel to the severing slits, the roots of the bean sprouts in all the severing slits need to be simultaneously severed by a blade edge. Accordingly, since a load at the time of severance is increased, a driving power of an electric motor for driving the cutter blade needs to be increased accordingly. As a result, the size of the driving motor and an amount of electric power consumed are disadvantageously increased.

In view of the aforesaid problem, the cutter blade is preferably formed in such a zigzag shape that an edge thereof for severing the root of the bean sprout obliquely intersects the severing slits as seen from above. In this construction, the blade edge of the cutter blade obliquely intersects the edges of the severing slits when passing the severing slits. A point of intersection is moved along the edges of the severing slits with movement of the cutter blade. Accordingly, since the roots of the bean sprouts in the respective severing slits can gradually be severed, they can easily be severed and the driving power of the motor driving the cutter blade can be reduced. Consequently, reductions in the size of the driving motor and a consumption of electric power can be achieved.

The overall cutter blade may be formed into the zigzag shape. However, in the case where the upper edge of the cutter blade is zigzag, the bean sprouts are caught on the upper edge of the cutter blade at a high rate when the bean sprouts are supplied onto the severing and dewatering table from over the cutter blade.

In view of the aforesaid problem, the cutter blade is preferably formed so that an inclination thereof relative to the severing slits is reduced from a lower side to an upper side, and the cutter blade preferably has a generally straightforward upper edge. In this construction, the rate at which the bean sprouts are caught on the upper edge of the cutter blade can be decreased.

The cutter blade preferably has an upper edge provided with slipping means for slipping the bean sprouts off. Consequently, the slipping means can further prevent the bean sprouts from being caught on the blade edge of the cutter blade.

When the cutter blade is moved only in the carrying direction, the bean sprouts are scraped up together on the severing and dewatering table to be piled up. Roots of the bean sprouts located at an upper layer of the piled bean sprouts cannot sometimes be severed.

As a countermeasure, the cutter blade is preferably moved alternately repeatedly forward by a first predetermined distance and backward by a second predetermined distance, the second predetermined distance being shorter than the first predetermined distance. In this construction, the piled-up bean sprouts on the severing and dewatering table are broken when the cutter blade is moved backward such that unsevered bean sprouts can be caused to flow into the severing slits. Consequently, the roots of the bean sprouts piled up on the severing and dewatering table can uniformly be severed.

A plurality of the cutter blades are preferably disposed at a predetermined interval and each cutter blade is connected to a rotated chain. Since the cutter blades are driven by a single driving source, the structure of the driving system can be simplified.

The invention also provides an apparatus for severing roots of bean sprouts and dewatering the bean sprouts, comprising a severing and dewatering table having a number of severing slits each of which has such a width that a root of a bean sprout falls into each severing slit, a cutter blade provided on the severing and dewatering table, means for supplying bean sprouts onto the severing and dewatering table after the bean sprouts have been washed in water, blowing means for blowing from above the severing and dewatering table so that a flow of air flowing downward through the severing slits is produced, and cutter drive means for moving the cutter blade along an upper side of the severing and dewatering table. Consequently, the roots of the bean sprouts can efficiently be severed simultaneously with dewatering while the damage to the bean sprouts is reduced as much as possible.

BRIEF DESCRIPTION OF THE DRAWINGS

Other objects, features and advantages of the present invention will become clear upon reviewing the following description of the preferred embodiment, made with reference to the accompanying drawings, in which.

DETAILED DESCRIPTION OF AN EMBODIMENT

One embodiment of the present invention will be described with reference to the accompanying drawings. The construction of a root severing and dewatering apparatus for bean sprouts will first be described. The apparatus comprises a severing and dewatering table 11 including a number of generally bar-shaped members 12 each of which has a triangular section. The bar-shaped members 12 are arranged in parallel at a predetermined interval. Each bar-shaped member 12 is fixed so that one of the corners thereof is located lower than the other two which are located in parallel to each other. The corners of each bar-shaped member 12 are formed into blade edges for severing roots of bean sprouts respectively. The bar-shaped members 12 are arranged so that a severing slit 13 is defined between the blade edges of the bar-shaped members 12 adjacent each other. Each severing slit 13 has such a width that a root of a bean sprout falls into each severing slit. For example, when a haulm of the bean sprout is in a range of 2.5 to 5 mm, the width of each severing slit 13 preferably ranges between 1.5 and 2.5 mm, or more preferably, the width is set substantially at one half of the haulm of the bean sprout.

Figure 4:
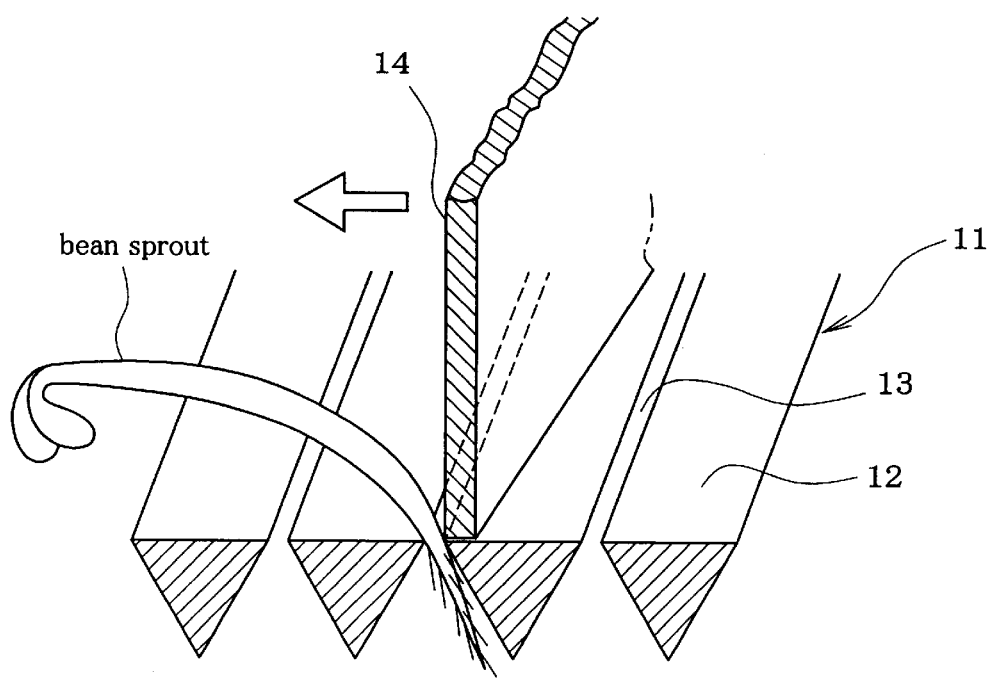
FIG. 4 is a perspective view showing the state where the roots of the bean sprouts are severed by the severing and dewatering table and the cutter blade.

A plurality of cutter blades 14 are disposed at a predetermined interval on the severing and dewatering table 11. Each cutter blade 14 is connected to a chain 15 serving as cutter driving means. The chain 15 extends between two sprockets 16 and 17 provided at entrance and exit sides of the severing and dewatering table 11 respectively. The chain 15 is turned by an electric motor (not shown) so that each cutter blade 14 is moved along an upper side of the severing and dewatering table 11 in a direction perpendicular to the severing slits 13. At this time, each cutter blade 14 is moved while the blade edge or lower end thereof is in a slight contact with the upper face of the bar-shaped member 12 or a small clearance is formed therebetween, whereupon the roots of the bean sprouts having fallen in the severing slit 13 are severed by the blade edges of the cutter blades 14 as shown in FIG. 4.

Figure 1:
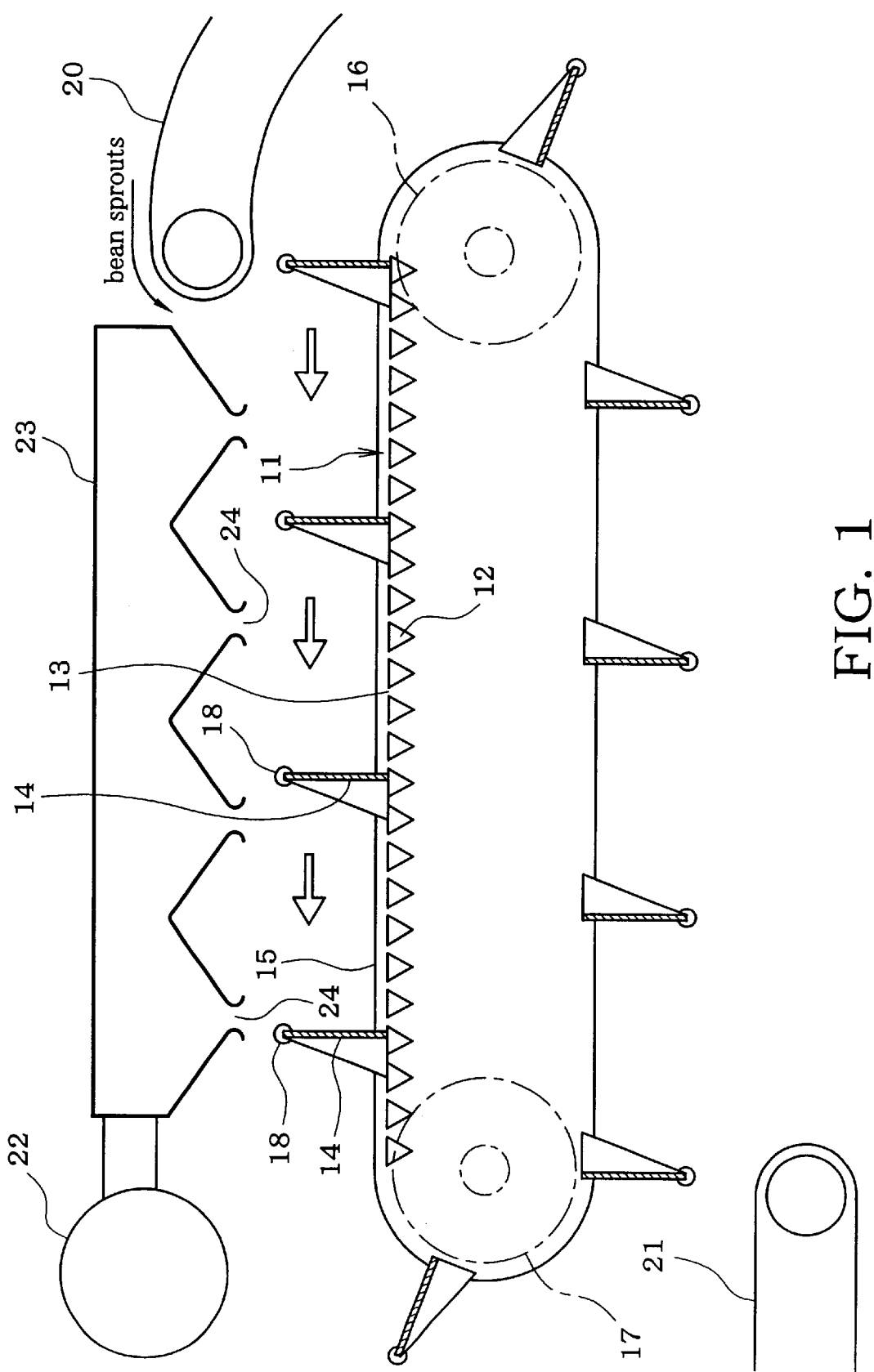
FIG. 1 is a front view of the severing and dewatering apparatus of one embodiment in accordance with the present invention.
Figure 2:
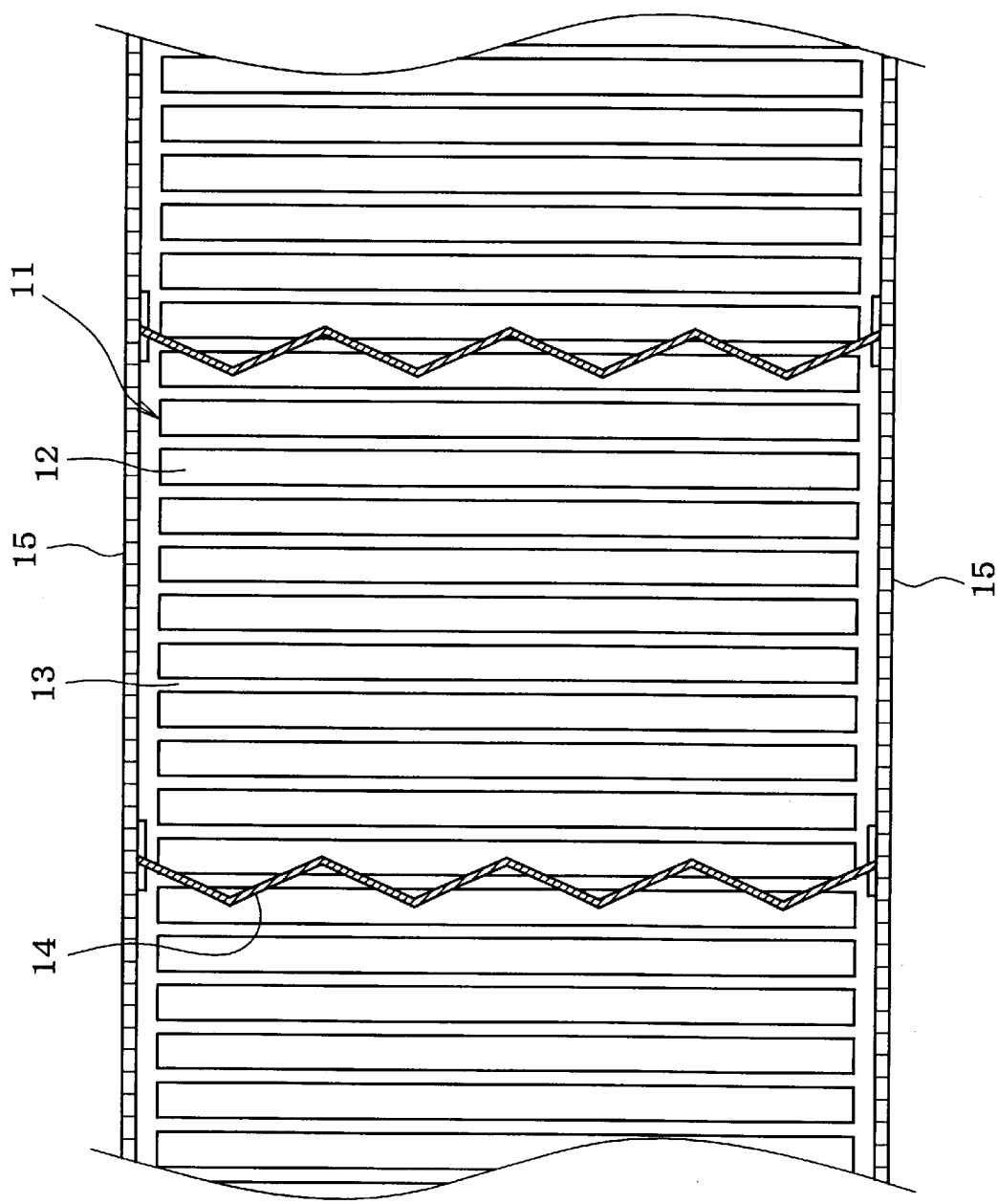
FIG. 2 is a partial plan view of the severing and dewatering table.
Figure 3:
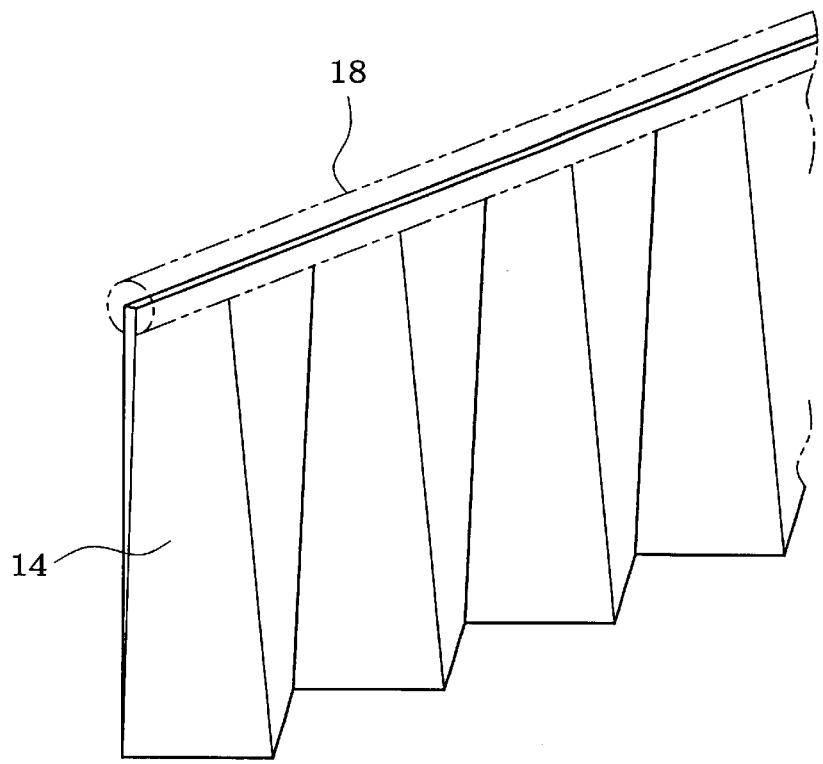
FIG. 3 is a partial perspective view of the cutter blade.

Each cutter blade 14 is formed in such a zigzag shape that an edge thereof obliquely intersects the severing slits 13 as seen from above as shown in FIG. 2. Each cutter blade 14 is further formed so that an inclination thereof relative to the severing slits 13 is reduced from a lower side to an upper side and the cutter blade has a generally straightforward upper edge, as shown in FIGS. 1 and 3. Additionally, the upper edge of each cutter blade 14 is provided with slipping means 18 for slipping the bean sprouts off.

A blowing casing 23 is provided over the severing and dewatering table 11 and connected to the discharge opening of a blower 22. Air from a plurality of air outlets 24 formed in the backside of the casing is caused to blow substantially against the overall surface of the severing and dewatering table 11. The blower 22 and the blowing casing 23 constitute blowing means.

A bean sprout supply conveyor 20 serving as means for supplying bean sprouts is provided at the entrance side of the severing and dewatering table 11. Bean sprouts washed in water are continuously supplied onto the severing and dewatering table 11 by the bean sprout supply conveyor 20. A carrying conveyor 21 is provided at the exit side of the severing and dewatering table 11 for carrying the bean sprouts scraped out of the severing and dewatering table 11 by the movement of the cutter blade 14.

The chain 15 is turned by the motor during operation of the severing and dewatering apparatus described above so that each cutter blade 14 is moved along the upper side of the severing and dewatering table 11 in the direction perpendicular to the severing slits 13. Further, the blower 22 is operated so that the bean sprouts washed in water are continuously supplied onto the severing and dewatering table 11 while air from the air outlets 24 formed in the backside of the casing is caused to blow substantially against the overall surface of the severing and dewatering table 11.

Air blown against the severing and dewatering table 11 flows downward through the severing slits 13 between the bar-shaped members 12. Accordingly, the roots of the bean sprouts supplied onto the severing and dewatering table 11 are caused to flow into the severing slits 13 with the air flowing toward the severing slits 13 (see FIG. 4). The roots are severed by the cutter blade 14 and the water adherent to the bean sprouts are blown away downward from the severing slits 13 by the wind pressure, whereby the bean sprouts are dewatered. As a result, since the severing of the roots of the bean sprouts and dewatering is efficiently performed, the quality of the bean sprouts can be improved with improvement in the productivity.

The bean sprouts from which the roots thereof have been severed on the severing and dewatering table 11 are scraped onto the carrying conveyor 21 by the cutter blades 14 thereby to be fed to a next step such as a bean sprout packaging step. Thus, the cutter blades 14 serve to feed the bean sprouts out of the severing and dewatering table 11 after the severing of the roots as well as to sever the roots of the bean sprouts. Consequently, both severing the roots and dewatering the bean sprouts can efficiently be performed by the movement of the cutter blades 14 continuously even when the wind pressure is increased for enhancement of the dewatering performance.

When the cutter blades 14 are moved only in the carrying direction, the bean sprouts are scraped up together on the severing and dewatering table 11 to be piled up. Roots of the bean sprouts located at an upper layer of the piled bean sprouts cannot sometimes be severed.

As a countermeasure, the cutter blades 14 are preferably moved alternately repeatedly forward by a first predetermined distance and backward by a second predetermined distance, the second predetermined distance being shorter than the first predetermined distance. In this construction, the piled-up bean sprouts on the severing and dewatering table 11 are broken when the cutter blades 14 is moved backward such that unsevered bean sprouts can be caused to flow into the severing slits 13. Consequently, the roots of the bean sprouts piled up on the severing and dewatering table 11 can uniformly be severed. In this case, a ratio of the forward distance and the backward distance is 2:1, 3:1 or 4:1.

In the embodiment, each cutter blade 14 is formed in such a zigzag shape that an edge thereof for severing the root of the bean sprout obliquely intersects the severing slits 13 as seen from above. Each cutter blade may be formed into the shape of a flat plate, instead. However, when each flat cutter blade is disposed in parallel to the severing slits 13, the roots of the bean sprouts in all the severing slits need to be simultaneously severed by a blade edge. Accordingly, since a load at the time of severance is increased, a driving power of an electric motor for driving the cutter blades needs to be increased accordingly. As a result, the size of the driving motor and an amount of electric power consumed are disadvantageously increased.

In the embodiment, however, each cutter blade 14 is formed in such a zigzag shape that an edge thereof for severing the root of the bean sprout obliquely intersects the severing slits 13 as seen from above. In this construction, the blade edge of each cutter blade 14 obliquely intersects the edges of the severing slits 13 when passing the severing slits 13. A point of intersection is moved along the edges of the severing slits 13 with movement of each cutter blade 14. Accordingly, since the roots of the bean sprouts in the respective severing slits 13 can gradually be severed, they can easily be severed and the driving power of the motor driving the cutter blades 14 can be reduced. Consequently, reductions in the size of the driving motor and in a consumption of electric power can be achieved.

The overall cutter blade 14 may be formed into the zigzag shape. However, in the case where the upper edge of the cutter blade 14 is zigzag, the bean sprouts are caught on the upper edge of the cutter blade 14 at a high rate when the bean sprouts are supplied onto the severing and dewatering table 11 from over the cutter blade 14.

In the embodiment, however, each cutter blade 14 is formed so that an inclination thereof relative to the severing slits 13 is reduced from a lower side to an upper side, and each cutter blade 14 has a generally straightforward upper edge. Consequently, the rate at which the bean sprouts are caught on the upper edge of each cutter blade 14 can be decreased. Further, since each cutter blade 14 has an upper edge provided with slipping means 18 for slipping the bean sprouts off. Consequently, the slipping means 18 can further prevent the bean sprouts from being caught on the blade edge of each cutter blade 14.

In a case where each cutter blade formed into the shape of the flat plate is used, each cutter blade and each severing slit 13 can obliquely intersect each other even when each cutter blade is inclined relative to the severing slits 13. However, when each cutter blade is inclined, the bean sprouts pushed by the cutter blade to be moved is gradually piled up along the inclination of each cutter blade one-sidedly. The roots of the bean sprouts located at an upper layer of the piled bean sprouts cannot sometimes be severed.

In the embodiment, however, each cutter blade 14 is formed in such a zigzag shape that an edge thereof for severing the root of the bean sprout obliquely intersects the severing slits 13 as seen from above. Accordingly, even when each cutter blade 14 is disposed to be perpendicular to the moving direction, the blade edge of each cutter blade 14 can obliquely intersect the severing slits 13. Consequently, the bean sprouts can be prevented from being pushed by each cutter blade 14 to be gathered at one side of the each cutter blade 14 and accordingly, the roots of the bean sprouts can uniformly severed by effectively using each overall cutter blade 14.

When each cutter blade used is flat, the bar-shaped members 12 (severing slits 13) are disposed to obliquely intersect the moving direction of each cutter blade. Consequently, since each cutter blade is disposed to be perpendicular to the moving direction, the bean sprouts moved by each cutter blade can be prevented from being gathered at one side of each cutter blade.

Although the severing and dewatering table 11 is fixed and each cutter blade 14 is moved in the foregoing embodiment, each cutter blade 14 may be fixed and the severing and dewatering table 11 may be moved.

The severing slits of the severing and dewatering table 11 may be formed by punching a metal plate, for example. Alternatively, the severing and dewatering table 11 may comprise a number of bar-shaped members 12 having respective edges for severing the root of the bean sprout and arranged in parallel at an interval of a space substantially equal to the width of each severing slit 13. In this construction, the spaces between the bar-shaped members 12 serve as the severing slits 13 respectively. Consequently, the space between the bar-shaped members 12 can be changed according to a type or size of the bean sprout whereupon the intervals of the severing slits 13 can easily be adjusted. In this case, each bar-shaped member 12 is not limited to the one with a triangular section. At least one of the corners of each bar-shaped member 12 may be formed into an blade edge for severing the root of the bean sprout.

Further, when the width of each severing slit 13 is slightly increased so that a time of the severing step is increased, an upper end leaf portion of the bean sprout is severed as well as the root thereof, whereby only the sprout portion can be produced.

When the severing slits of the severing and dewatering table are formed by punching a metal plate, the cutter blades may be moved along the underside of the severing and dewatering table since the table has a small thickness.

A manner for supplying air onto the severing and dewatering table 11 may be changed. For example, a plurality of blowers may be provided on the severing and dewatering table 11 so that air from each blower is supplied onto the severing and dewatering table 11.

Additionally, the structure for driving the cutter blades 14 may be changed.

The foregoing description and drawings are merely illustrative of the principles of the present invention and are not to be interpreted in a limiting sense. Various changes and modifications will become apparent to those of ordinary skill in the art. All such changes and modifications are seen to fall within the scope of the invention as defined by the appended claims.

What is claimed is:

1. A method of severing roots of bean sprouts and dewatering the bean sprouts comprising the steps of:
   supplying bean sprouts washed in water onto a severing and dewatering table having a number of severing slits each of which has such a width that a root of a bean sprout falls into each severing slit;
   causing air to blow from above the severing and dewatering table so that a flow of air flowing downward through the severing slits is produced to cause the roots of the bean sprouts on the severing and dewatering table to fall into the severing slits; and
   severing the roots of the bean sprouts fallen in the severing slits by a cutter blade while water adherent to the bean sprouts are being blown away by wind pressure downward from the severing slits.

2. The method according to claim 1, wherein the cutter blade is moved along an upper side of the severing and dewatering table.

3. The method according to claim 1, wherein the severing and dewatering table comprises a number of bar-shaped members having respective edges for severing the root of the bean sprout and arranged in parallel at an interval of a space substantially equal to the width of each severing slit, and the spaces between the bar-shaped members serve as the severing slits respectively.

4. The method according to claim 1, wherein the cutter blade is formed in such a zigzag shape that an edge thereof for severing the root of the bean sprout obliquely intersects the severing slits as seen from above.

5. The method according to claim 4, wherein the cutter blade is formed so that an inclination thereof relative to the severing slits is reduced from a lower side to an upper side and the cutter blade has a generally straightforward upper edge.

6. The method according to claim 1, wherein the cutter blade has an upper edge provided with slipping means for slipping the bean sprouts off.

7. The method according to claim 1, wherein the cutter blade is moved alternately repeatedly forward by a first predetermined distance and backward by a second predetermined distance, the second predetermined distance being shorter than the first predetermined distance.

8. The method according to claim 1, wherein a plurality of the cutter blades are disposed at a predetermined interval and each cutter blade is coupled with a rotated chain.

9. An apparatus for severing roots of bean sprouts and dewatering the bean sprouts, comprising:
   a severing and dewatering table having a number of severing slits each of which has such a width that a root of a bean sprout falls into each severing slit;
   a cutter blade provided on the severing and dewatering table;
   means for supplying bean sprouts onto the severing and dewatering table after the bean sprouts have been washed in water;
   blowing means for blowing from above the severing and dewatering table so that a flow of air flowing downward through the severing slits is produced; and
   cutter drive means for moving the cutter blade along an upper side of the severing and dewatering table.

* * * * *